Dec. 25, 1956

E. A. J. DOURY 2,775,299

RECORD CARD REPRODUCING PUNCHING MACHINE WITH PROGRAM CONTROL

Filed April 22, 1952

United States Patent Office

2,775,299
Patented Dec. 25, 1956

2,775,299

RECORD CARD REPRODUCING PUNCHING MACHINE WITH PROGRAM CONTROL

Elie Adrien Jules Doury, Paris, France, assignor to Compagnie des Machines Bull (Société Anonyme), Paris, France Application April 22, 1952, Serial No. 283,788

Claims priority, application France October 2, 1951

12 Claims. (Cl. 164—115)

The present invention refers to improvements in record card machines and more particularly to the perforated card machines called "punching-reproducing machines" known as "punching duplicating machines with program control."

It is well known that such machines are usually controlled by means of cards called "master cards" intended for the automatic reproduction of data called "constants," which exist as perforations in the said cards, and are to be reproduced on "detail cards." Variable data may also be punched by hand on the detail cards by the operator, who reads it from basic control papers, and is at the same time able to check on whether the constants in the process of being reproduced must be modified or not. On an ordinary machine, the changing of constant data necessitates stopping the machine for replacement of the master card.

It also happens frequently that a set of cards includes classification data which is only constant in varying degrees. For example, a set of 200 cards including an absolutely constant data in one group of columns or field, may also include semi-constant data in others, some varying every 50th card and others every 10th card, these quantities being cited in a purely illustrative manner.

In order to make full use of the possibilities of the machine, it is advisable that the reproduction of the semi-constant data be made automtaic. Attempts have been made with this object in view; especially noteworthy are the data storage devices which have been added to these machines in order to store the semi-constant data and then control the reproduction by punching.

The automatic control of certain functions of the machine has also been suggested. This would be brought about either by means of the master card or by means of the already mentioned storage device, these functions being for example the column skipping or spacing, the field skipping or tabulation, the ejection of the detail card, etc.

Generally speaking, the object of the present invention consists in improving a punching reproducing machine, fitted with an essentially electrical storage device for alphanumerical data, in order to adapt the machine to a partial control by a single master card called "director card," which besides the perforations of an absolutely constant data to be reproduced on a set of cards, also bears perforations indicating a "program" field, in combination with other perforations indicating columns of "semi-constant" data which perforations when read by an analyzing station, result in the operation of the data storage device either for the manual introduction of data or for the automatic reproduction of stored data.

More particularly, the object of the invention is a punching-reproducing machine controlled partly manually, and partly by means of a single special master card called "director card," having perforations in certain columns, which indicate a "program" field and other perforations indicating columns of "semi-constant" data, this machine being fitted with a data storage device arranged in groups of coded relays and circuit selecting organs, and with organs responsive to the combined analysis of both kinds of perforations mentioned above, and controlling the operation of a group of organs of the storage device, which corresponds to the column of the "director card" being analyzed; thereby ensuring the automatic reproduction on a detail card of the data registered by the said group.

For its object, the present machine also has a punching-reproducing machine, controlled partly manually and partly by means of a single special master card called "director card" having a special perforation in the columns of a "program" field, a special perforation in the columns of a "semi-constant" field included in said program field, and a third special perforation in the first column of said "semi-constant" field, the machine being fitted with organs responsive to the simultaneous reading of the three special perforations in the said last mentioned column, in order to control the means used for discontinuing the control of the punching devices, by a data storage device, and to stop the machine, in order to allow for the semi-automatic working procedure.

For its further object, the present invention has a punching-reproducing machine, as defined above, fitted with manual control organs, actuated by the operator when he does not wish to change the stored semi-constant to be reproduced, and which causes the re-starting of the machine and the resumption of the automatic reproduction under the control of the data storage device.

For its object, the present invention also includes a punching reproducing machine as defined above, equipped with manual control organs which are operated by the operator when wishing to change the stored semi-constant to be reproduced, due to which, controls are put into operation, in order to eliminate the "read out" devices of the data storage device and also in order to place the groups of organs of the storage device in a storing condition. This is accomplished, group by group, during the analysis of the perforations indicating the semi-constant data of the director card.

For its further object, the present invention includes a punching-reproducing machine, as defined above, which is equipped with manual control organs, actuated by the operator for the making-up of a new "director card"; as a result of the actuation of these means, the manual punching of a new constant on the new "director card" is made possible, as well as the automatic reproduction of the perforations of the "program" and "semi-constant" fields of the former "director card" (used as "master card") on the new one, being used in this case as "detail card."

Another object of the invention consists in a codification method for storing alphabetical data already coded, numerical data forming the basis of the alphabetical codification, as well as combinative data for function control with a limited number of relays and without mutual interference; this method makes it possible to provide for a three relay group for seven numerical components of the alphabetical code, a two relay group for three other numerical components, and a relay for a final numerical component, this latter relay being used with a relay belonging to each of the groups mentioned, in order to register function control data.

Other aims and advantages of the invention will be brought out by the following description, which explains a preferred method for the realization of the improvements attained, and also from the drawings attached by way of nonrestrictive example.

Fig. 1 shows a special master card called "director card."

Figs. 2a, 2b, 2c, 2d, when assembled, form the theoretical electrical diagram of a punching-reproducing machine, in accordance with the invention.

Fig. 3 indicates the manner of assembly for the figures of the electrical diagram.

Figure 4:
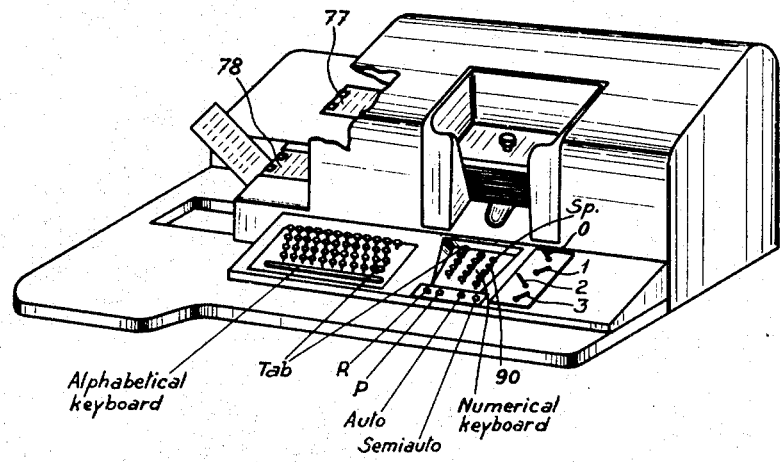
Fig. 4 shows a perspective view of the punching-reproducing machine, according to the invention.

The machine shown in Fig. 4, apart from the fact that it is provided with the improvements which are the subject of the invention, is a usual punching-reproducing machine, having alphabetical and numerical keyboards, and an automatic reproduction device for the constants. The carriage bears a master card 77 to be reproduced, and a detail card 78, which it pushes forward simultaneously, one under an analyzing brush structure and the other under a punching block. The depression of a key of the alphabetical key-board reacts on the punching block, which is put into action by an electrical device, and simultaneously causes the punching of two numerical perforations corresponding to the key which has been depressed, in accordance with a code known as the Bull code.

This code is as follows:

```
A = 11-7    K = 0-8     U = 1-9
B = 0-7     L = 1-8     V = 2-9
C = 1-7     M = 2-8     W = 3-9
D = 2-7     N = 3-8     X = 4-9
E = 3-7     P = 4-8     Y = 5-9
F = 4-7     Q = 5-8     Z = 6-9
G = 5-7     R = 6-8     I = 1
H = 6-7     S = 11-9    O = 0
J = 11-8    T = 0-9
```

The machine shown by Fig. 4 differs in its external appearance and correspondingly in its working from the usual punch-reproducing machine by having four control keys "0," "1," "2," "3," on the right hand side of the numerical keyboard, and two sets of push-buttons referenced "R," "P," "Auto" and "Semi-Auto." The purposes and operation of said keys and push-buttons will be precised further on.

Figure 1:
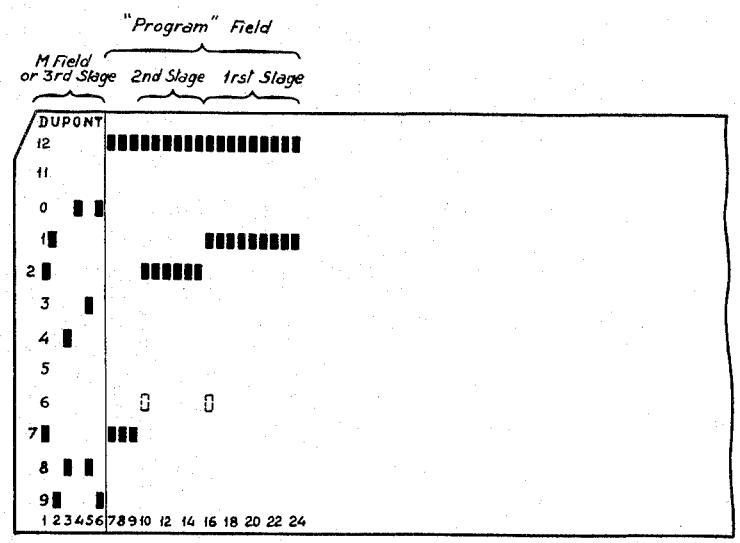

Fig. 1 represents an example of a "director card" or special master card for controlling the machine in accordance with the invention.

In columns 1 to 6, alphabetical combinations are punched which represent the name Dupont, according to the Bull code which is shown above. These columns constitute the M field, that is to say the "Master" or third stage constant field. When the columns of this field pass under the analyzing brush structure, the perforations are automatically reproduced on the detail card which has been placed on the carriage. This data may be considered as absolutely constant, at least for a determined stack of cards to be punched.

In each column from 7 to 24, the perforation "12" appears, which indicates a "program" field. This means when these perforations are analyzed, certain operations will be automatically carried out by the machine, unless the operator prevents these operations by putting certain manual organs into action beforehand. A perforation "7" may be observed in columns 7, 8 and 9. As a result of analyzing the combination 12-7, the carriage is advanced by one column or space.

The "program" field also comprises two fields of "semi-constants," marked "second stage" (columns 10 to 15) and "first stage" (columns 16 to 24). The second stage field corresponds to data which may vary once or several times for a determined stack of cards while the first stage field corresponds to data which may vary even more often than the second stage data for the same stack of cards.

The columns of 2nd and 1st stage data are signalled by the presence of a perforation "2" or "1" respectively, which, when analyzed, indicate that a storage device, will be put into action in order to control column by column, the reproduction of the coded data it contains, unless the operator has observed a change in the semi-constant data in the control papers, in which case he actuates a control key, as explained further on.

The analyzing of the perforation combinations "12" and "2" or "12" and "1," if the operator has found a change in the semi-constant data in the control papers and has actuated the above mentioned control key, results in the operation of the storage device for resetting it eventually to zero, and preparing it for the entering of new semi-constants.

According to the invention, the machine is equipped with an operation control switch, which in one position permits "automatic" functioning, and in the other position, permits "semi-automatic" functioning. In the first case, the operator must be well trained and must be able to notice a change of semi-constant, during the carriage return and before the arrival of a new detail card to the punching position in the "program" field.

In the case of semi-automatic functioning, provision for a special perforation "6" is made in the first column (or left column) of each second and first stage data. This special perforation, when read in combination with perforations "12" and "1" or "12" and "2" causes the stopping of the carriage with the said column in the analyzing position for the director card, and in the punching position for the detail card.

According to the invention, the machine is also provided with further control organs which are governed by buttons or keys.

These keys are as follows:

Key 0 or duplicating key: Used only in semi-automatic functioning. Actuated in cases where there is no change in semi-constant, it puts the storage device into action again, in order to control the automatic reproduction of a stored data, which reproduction continues until the analysis of a following perforation "6" on the director card.

Key 2: Actuated during the ejection of a card and return of the carriage in automatic functioning, or after the stopping of the carriage in semi-automatic functioning, it causes the carriage to stop successively at all the second and first stage semi-constant columns, and allows for the storing of new data, the former data being beforehand cancelled in the storage device.

Key 1: Actuated like key 2, causes the carriage to stop only at first stage semi-constant columns.

Key 3: Actuated when the operator, taking another stack of cards, wishes to establish a new director card with a new third stage constant but with the same program field perforations as the previous director card.

Figure 5:
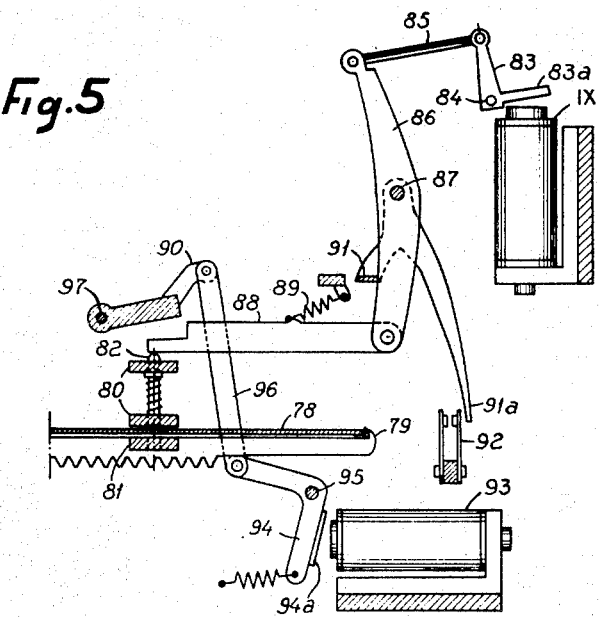
Fig. 5 represents a transverse view of the punching block of the machine.

By way of example a detailed view of the punching block is given by Fig. 5. The detail card 78, which may be driven by the card carriage 79, passes between the punch-guide 80 and die 81. There are twelve punches 82 aligned in correspondency with the twelve index-point positions on the card. The punching block comprises twelve punch electro-magnets 0 to XII, only one of which being represented. For instance, when electro-magnet IX is energized, its armature 83a is attracted and the bell-crank lever 83 rocks in a clockwise direction on the pivot 84. By means of link 85, lever 86 is rocked in a clockwise direction on the fixed axle 87, and it pushes the interposer bar 88 from right to left, against the action of spring 89, so that the recessed portion of interposer bar 88 is engaged under a lug of the hammer 90.

The general bail 91 extends in front of the twelve levers 86, so that when any one of said levers is rocked, it undergoes a small rotation on axle 87 and its extension 91a closes the contact 92. When closed, contact 92 permits the completion of an energizing circuit for feeding the punching electro-magnet 93. This circuit will be referred to when discussing the circuit diagram. The energization of electro-magnet 93 results in the attraction of armature 94a fixed on bell-crank lever 94. This causes said lever 94 to rock in a counterclockwise direction on the pivot 95, thus actuating the hammer 90 by the intermediary of rod 96. When hammer 90 is actuated and rocked on the fixed axle 97, its lug encounters the top edge of the interposer bar shifted, thus driving the corresponding punch 92 into card 78. Other organs, not shown, cut off the energization circuits for the described electro-magnets, cause the resetting of the movable parts to their home positions and the operation of the usual escape mechanism, which brings about a stepping movement of carriage 79 toward the left, thus setting the next card column in punching position.

The invention will be more fully understood after examining the electrical diagram and several working examples.

Figure 2A:
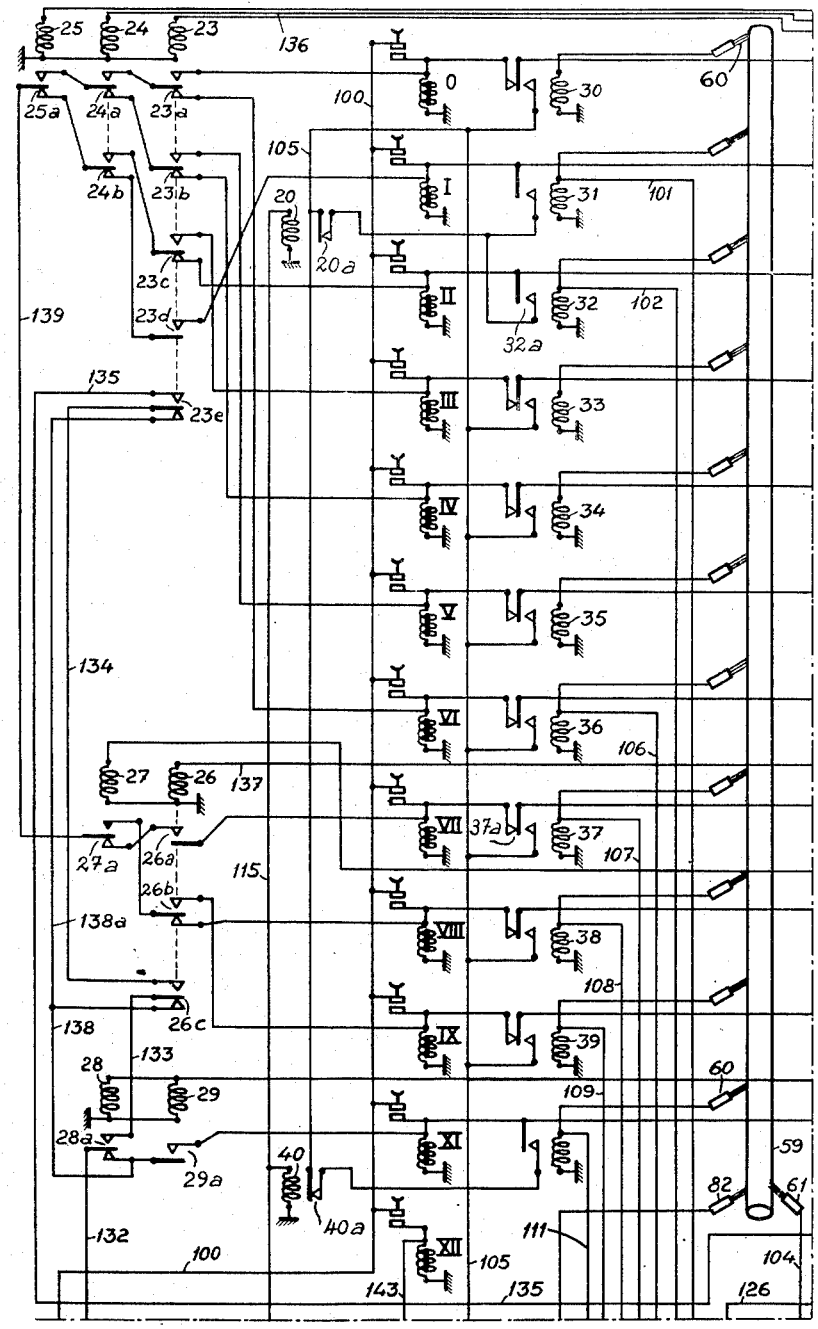

In Fig. 2a, the windings 0, I, II to XI and XII indicate the punch selecting electro-magnets for punching the detail card. Each electro-magnet may be energized when the associated key 90 is depressed. Only the keys of the numerical keyboard have been represented in Fig. 2a, since it is taken for granted that the pressing of a letter key of the alphabetical keyboard, in most cases causes the actuation of two punch-selecting electro-magnets according to the code above.

The analysis means for the director card 77 advancing column by column is comprised of the brushes 60 and contact roller 59 (Figs. 2a and 2e); said means permits the selective energizing of the analysis relays 30 to 39, and 41, which correspond respectively to the perforation positions 0 to 9 and 11 of a card column.

A brush 82 (Fig. 2a) is provided for the analysis of the perforation position "12." It is not connected to an analyzing relay, strictly speaking, but it is used for establishing various control circuits which will be examined later on.

The analyzing circuits are completed by contact 66a (Fig. 2b) in series with general brush 61, this contact normally being closed, its function will be more precisely defined later on.

Figure 2B:
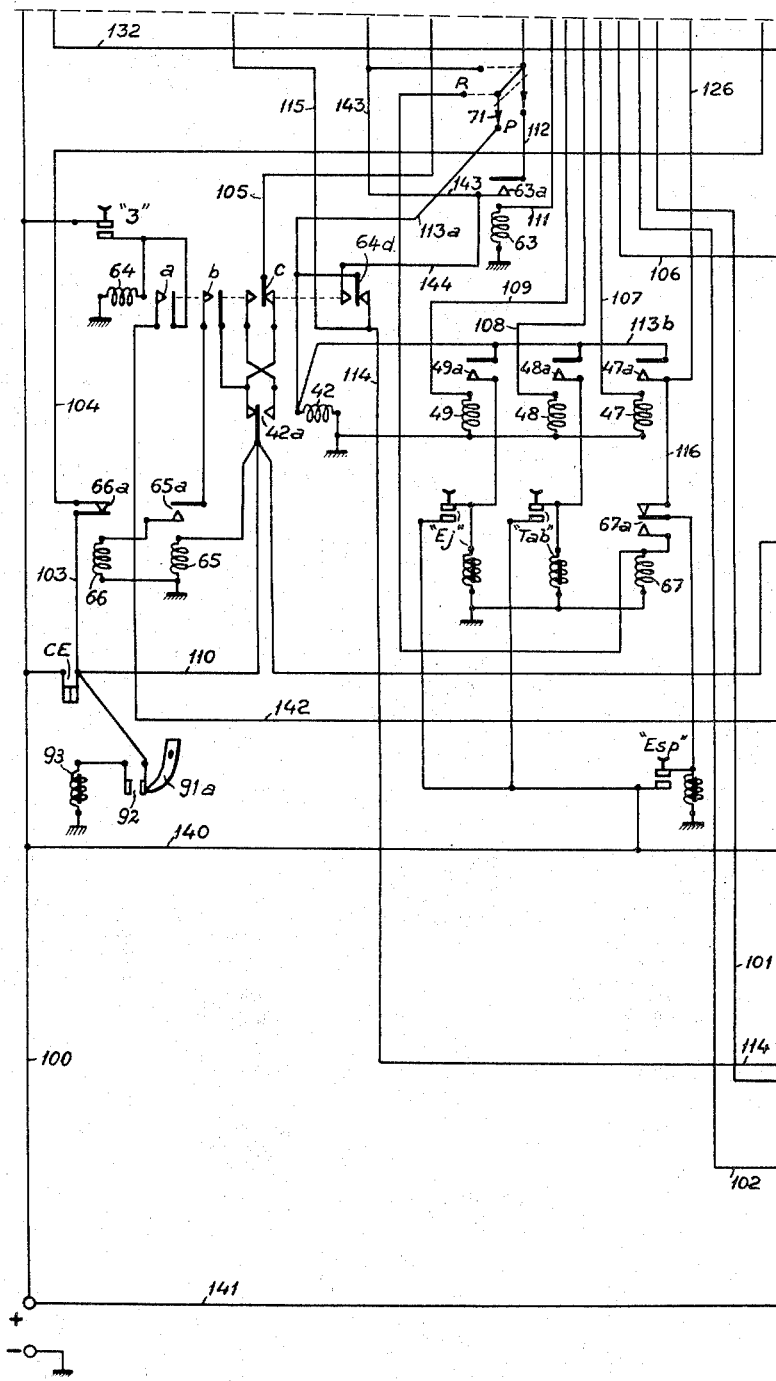

In Figure 2b, one may observe that the + terminal and the − terminal are normally connected to a current supply source, these polarity indications are not obligatory. The − terminal may be connected, for example to the metallic mass or ground of the machine, the returns of the relay and electro-magnet windings being shown with a ground connection.

Figure 2C:
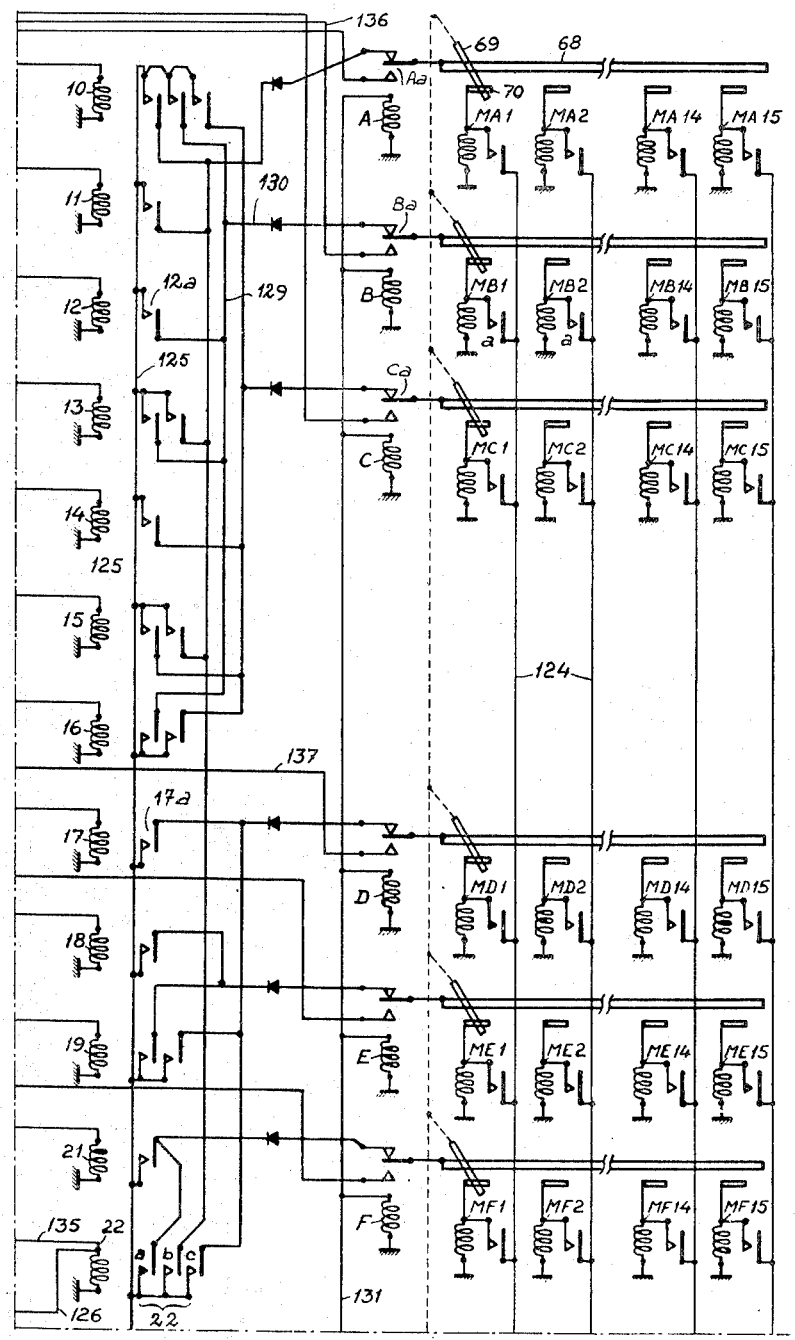

Relays 10 to 19, 21 and 22 are codification relays for the storing of semi-constants (Fig. 2c). It is seen (Figs. 2a and 2c) that if the alternating contacts 30a to 39a and 41a are not reversed, each of the codification relays (except 22) is in parallel with a corresponding punch-selecting electro-magnet. Each of these relays controls one or several codification contacts (Fig. 2c).

Figure 2c shows the organs of the storage device. This device has been designed for a fixed maximum capacity of 15 columns. It is made up of groups of electro-magnetic relays and of a column selector, similar to the well known telephone selectors.

Figure 2D:
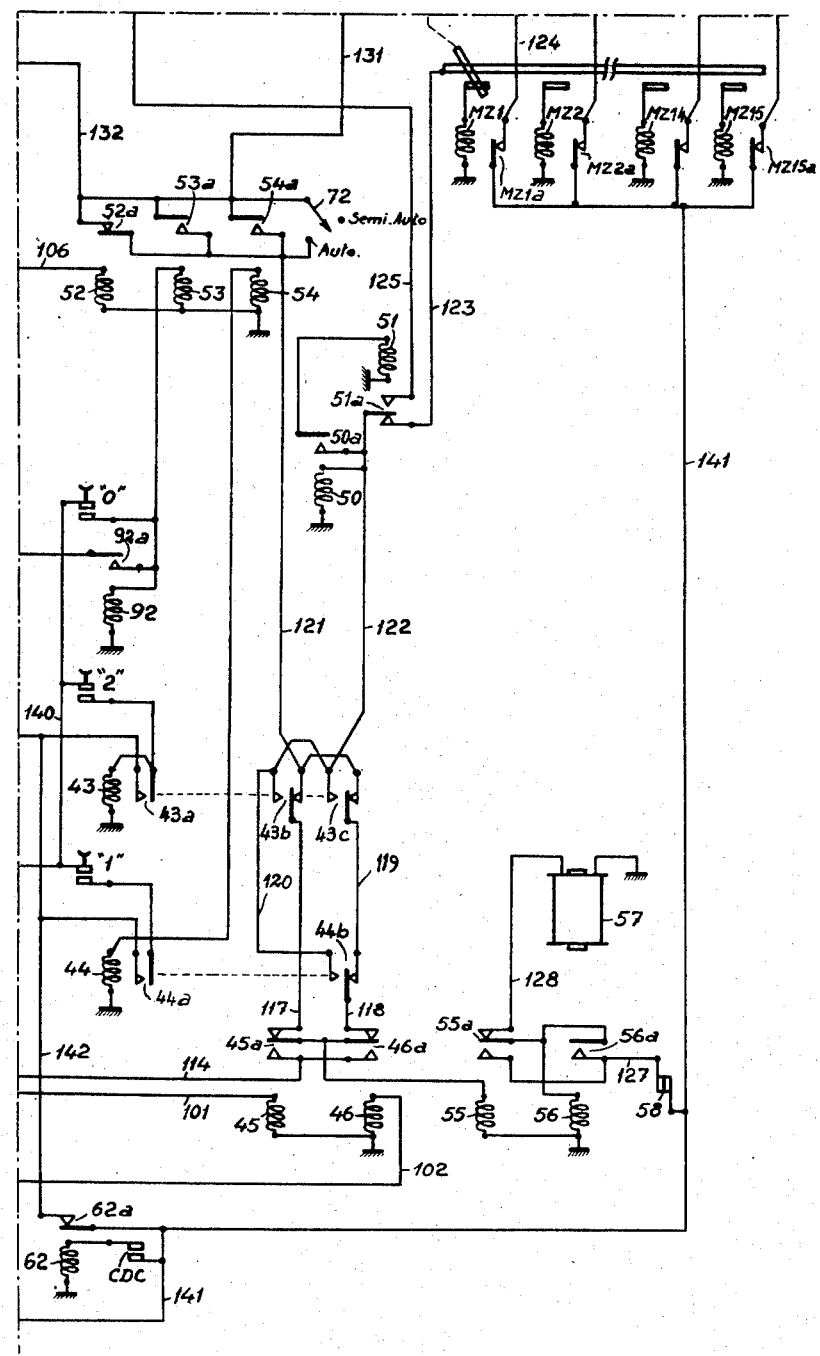

A storage device column consists of 6 storage relays: MA1, MB1, MC1, MD1, ME1, MF1 (Fig. 2c) and a relay for resetting to zero MZ1 (Fig. 2d). This is for column 1, the figure indexes changing for the other columns until the 15th.

Each of these relays controls a holding contact, which keeps it energized for the time during which a code component is being stored.

One of the features of the invention is to provide a code for storage of alphabetical data such as the code given below:

| Figures | Storage device | | | | | |
|---|---|---|---|---|---|---|
| | A | B | C | D | E | F |
| 0 | x | x | x | | | |
| 1 | x | | | | | |
| 2 | | x | | | | |
| 3 | x | x | | | | |
| 4 | | | x | | | |
| 5 | x | | x | | | |
| 6 | | x | x | | | |
| 7 | | | | x | | |
| 8 | | | | | x | |
| 9 | | | | x | x | |
| 11 | | | | | | x |
| "Spacing" | x | | | x | | x |

It may be observed that positions A, B, and C are used for the codification of the figures from 0 to 6, which in themselves constitute a part of the components of the Bull alphabetical code; positions D and E are used for the figures 7, 8 and 9 which make up the other part of the components of the alphabetical code in question; position F is used for figure 11, which is also a component of the same alphabetical code.

The storage device can also store the "spacing" combination (last line of the table), and in this case, a position of each of the groups defined above is utilized, that is to say, positions A, D and F. As will be seen later on, this codification method, makes it possible and easy to achieve the automatic control of the "spacing" function of the machine, by using the storage device column where this combination is stored.

Figure 3:
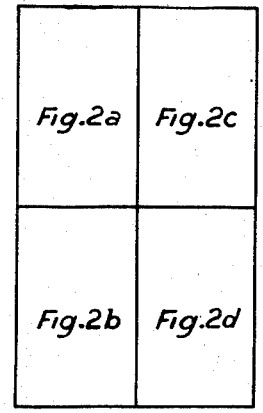

For the coded storage of letters, let us say, for example, that the letter N, coded in the Bull alphabetical code by the figures 3 and 8 is to be registered by the storage device; this will be effected by the combination A, B and E (storage device code).

Assuming that a telephone selector is known, let us remember, however, that it is usually composed of several banks of contact segments, each bank having a common segment, a plurality of isolated segments and a mobile wiper, moved step by step, establishing the contact successively between the common segment and each of the isolated segments; the banks are usually of circular structure and the mobile wipers or brushes are mechanically coupled to a common shaft, in such a way as to have all the brushes occupying the same angular position. A one step advancement of the brushes is caused by sending an impulse to a control electro-magent, of which the circuit can be interrupted by the selector itself, because of a mechanically operated contact, which opens by means of a cam, when the brush of a bank passes from one isolated segment to the next.

Figs. 2c and 2d show 7 selector banks, of which 68 (Fig. 2c) is a common segment, 70 one of the isolated segments and 69 a brush. All the brushes are shown in the contact position on column 1.

It is assumed that each selector bank includes 15 isolated segments in order to correspond to the capacity of the storage device, and that the selector brushes sweep the fifteen positions in one revolution, that is to say, that in leaving position 15, they automatically return to position 1.

Relays A, B, C, D, E and F each control an alternating contact and may be energized or not at the same time. When they are not energized, their contacts being in the position shown in the drawing, the common segments of the six positions from A to F are connected to the codification circuits, that is, are in condition for the entering of data into the storage device. When these relays are energized and their contacts reversed the said segments are connected to the decoding circuits, so that the storage device is in the read out condition.

The decoding elements are represented, Fig. 2a, by relays 23 to 29 and their contacts arranged in a known fashion in decoding circuits, in such a way as to reconvert a coded data, taken from a column of the storage device into its numerical code components. This will be later clarified by the use of examples.

It will now be noticed, however, that relay 28 controls a contact 28a and that each of the relays 23, 26 controls a supplementary alternating contact, intended for the establishing of a control circuit which prevents the punch reproduction of the combination A, D and F which represents the function "spacing" when said combination is read-out from the storage device in order to automatically control the skipping of a column or space (as has already been stated).

Fig. 2b shows certain members generally used in a punching-reproducing machine. The escape contact CE is closed when the carriage is stopped but is open during the time when the carriage moves between two stopping positions; other observations to be made include: a spacing key "Sp" and its electro-magnet, which controls the advancing of the carriage over the space between two consecutive columns, the tabulation key "Tab" and its electro-magnet, used for putting the carriage into motion and keeping it in motion until it is stopped by means of a checker, placed on the skip-bar, the ejection key "Ej" and its electro-magnet, used for controlling the advance of the carriage to the last column position, the ejection of the detail card and the return of the carriage to a position suitable for the receiving of a new detail card.

Fig. 2b shows a double reverser switch 71, which makes it possible for the machine to operate according to the invention, i. e. under the control of a director card, when in the position shown in the drawing, called position P. In position R, represented here by a dotted line, this reverser makes it possible for the machine to operate normally, that is, under the control of an ordinary master card.

The remainder of the diagram will be examined when describing the whole operation of the machine.

Let us suppose that a director card, such as the one shown in Fig. 1, is on the carriage and arrives at the analyzing position of column 1, and at the same time, a detail card is also on the carriage in a corresponding position under the punching block.

The automatic reproduction of the M field or third stage constant is immediately begun.

In this case, perforations 2 and 7, representing letter D are analyzed. Relays 32 and 37 (Fig. 2a) are energized by the circuit: + terminal (Fig. 2b) contacts CE, 103, 66a, line 104 (Figs. 2b, 2a), brush 61, contact roller 59 and by the associated brushes 60 respectively. They displace their contacts 32a and 37a in such a way as to connect the mobile blades with line 105 (Fig. 2a). This line is now alive, by means of the circuit: + terminal, conductor 100, contact CE, conductor 110, contacts 42a, 64c in the rest position. The punch-selecting electro-magnets II and VII are therefore energized, then punching electro-magnet 93 also is energized owing to the closure of contact 92. Perforations 2 and 7 are punched in the detail card, and the spacing of the carriage is automatically controlled in the usual manner, when the punches rise again. The automatic reproduction of the other letters of the third stage constant is carried out in the same manner.

Since the second and first stage constants must be initially stored in the storage device, when the first detail card passes, in this case, the operator should first have depressed key "2" (Fig. 2d), which energizes relay 43, which closes its holding contact 43a and displaces its contacts 43b and 43c. The initial energization circuit of relay 43 is: + terminal (Fig. 2b), conductors 100, 140 (Figs. 2b, 2d), the key "2" contact relay 43, ground connection. The holding circuit is: + terminal, conductor 141 (Figs. 2b, 2d), contact 62a, which is normally closed, conductor 142, contact 43a and relay 43.

After the perforation of column 6, the director card arrives at the analyzing position of column 7, which is the first column of the program field.

The analysis of perforation "12" by brush 82 (Fig. 2a) places conductors 112, 113a and b, 114 and 115 (Fig. 2b) under voltage, and entails on one hand, the energizing of relay 42 (Fig. 2b), which reverses its contact 42a, cancelling the voltage of line 105 and on the other hand, the energization of relays 20 and 40 (Fig. 2a) and thereby the opening of their contacts 20a and 40a. The analysis of perforation "7" by the appropriate brush, energizes relay 37 which reverses its contact 37a. Since line 105 is not under voltage, the closing of 37a cannot cause the operation of electro-magnet VII. Connected in parallel with relay 37, is conductor 107, which allows the simultaneous energization of relay 47 (Fig. 2b), which by closing its contact 47a, allows for the establishment of the following circuit: + terminal, 100, CE, 103, 66a, 104, brush 61, contact roller 59, brush 82, reverser 71 (left side), conductors 113a and 113b, contact 47a, conductor 116, contact 67a and electro-magnet "Sp."

The energization of this electro-magnet causes the carriage to advance by one column or space, as a result of the simultaneous analysis of perforations "12" and "7" in column 7 of the director card. The same thing is true for columns 8 and 9, and the director card finally stops in the analyzing position at column 10, or the first column of the "2nd stage constant" field. This is a result of the following facts:

As has already been indicated, the analysis of perforation "12," results in the application of voltage to conductors 114 and 115, and the reversing of 42a; analysis of perforation "2" energizes relay 32, which closes its contact 32a. Since line 105 is not under voltage, and since contact 20a is open, the closing of 32a cannot cause electro-magnet II to be energized. Wire 102, parallel on relay 32, permits the simultaneous energizing of relay 46 (Fig. 2d), thereby completing a circuit, starting from conductor 114 (Figs. 2b, 2d), by 46a reversed (Fig. 2d), 45a in the rest position, 117, 43c reversed, 122, and relay 50. The circuit continues momentarily, through 51a still in the rest position, 123, common segment 68 of the seventh selector bank (Fig. 2d), brush, insulated segment for column 1, relay MZ1. The latter opens its contact MZ1a, thereby cancelling the voltage of conductor 124 which will later be so used as to establish a holding circuit. The closing of 50a with a slight delay, causes the energizing of relay 51, which by reversing 51a, cancels the energization of MZ1 and forms a branch circuit forms a branch circuit from 122 and 51a, thereby putting the codification line 125 under voltage (Figs. 2d and 2c). In this state, the machine is ready to store data in the storage device.

According to Fig. 1, it has been determined in advance that the second stage constant will require a maximum of 6 columns (perforation "2" in the columns 10 to 15). If the second stage constant to be stored includes only 5 characters as in the word "Débit" for example, the combination "space" should be stored in the first column of the storage device. In order to bring this about, the operator need merely press the key "Sp" (Fig. 2b). The effect of this is first the skipping of one column by the carriage, and then, the completion of the circuit: + terminal, 100, 140, key "Sp," 67a in the position shown in the diagram, 116, 126 and relay 22. Since conductor 125 is under voltage, the closing of 22a, 22b and 22c causes the energizing of relays MA1, MD1, and MF1 both of which maintain their energization by means of their holding contacts and conductor 124. This results in the storing of the combination A, D, F therefore signifying a spacing.

Another result of the energization of relay 46 is to energize relay 55 (Fig. 2d). The reversing of contact 55a causes 56 to be energized, by means of the circuit: + terminal, 141 (Figs. 2b, 2d), 58, 127, 55a reversed and relay 56. This relay maintains its energization by means of its contact 56a. When the carriage advances by one step, the circuits which pass through the perforations "12" and "2" brushes are interrupted in such a way as to cancel the energization of 55, by 46a returning to the rest position. The mobile blade of 55a, returning to the rest position causes the electromagnet of selector 57 to be fed by the circuit: + terminal, 141 (Figs. 2b, 2d), 58, 127, 56a closed, 55a in the rest position, 128 and 57.

Thus the selector brushes are advanced one step, hence, on the segments of column 2 of the storage device, while, during this motion, the mechanical contact 58 opens, thereby stopping the energization of 56 and at the same time, the energization of 57.

The director card now being in the analyzing position at column 11, the first character of the second stage constant, is to be recorded, that is to say, the letter D in the example mentioned above. This letter being represented in the Bull code by the figures 2 and 7, the operator presses the two corresponding keys of the numerical keyboard, or key D of the alphabetical keyboard (not shown) thereby causing the perforations "2" and "7" to be punched in the detail card and also the energization of relays 12 and 17 (Figs. 2a, 2c). Following the analysis of perforations "12" and "2" the same circuits have been formed as for the preceding column, that is to say conductor 114 is alive, 46, 55, 50, 51 are energized and therefore the codification line 125 is alive.

As a result of 12a and 17a being closed, relays MB2 and MD2 are energized, this representing the storage of the combination B—D, according to the codification table of the storage device. The complete circuit for the energization of relay MB2, for instance, is the following: Fig. 2b, + terminal, 100, CE, 103, 66a, 104 (Figs. 2b, 2a) 61, 59, brush 82, left side of reverser 71 (Fig. 2b), conductor 113a, 64d, 114 (Figs. 2b, 2d), 46a reversed, 45a in the rest position, 117, 43c reversed, 122, 51a reversed, 125 (Fig. 2d) (Fig. 2c), 12a, 129, 130, Ba in the rest position, common segment 68 of the second bank starting from the top, brush, segment, relay MB2.

The operator proceeds in the same way for storing the other second stage constant characters, and then for the storing of the first stage constant. For the latter, 9 columns are provided on the director card (Fig. 1) and if the constant to be stored requires for instance only 6 columns, the operator will, as previously shown, have to register the space combination in the 7th, 8th and 9th columns of the storage device which correspond to columns 16, 17 and 18 of the director card.

After storing in the 15 storage device columns has taken place the director card is in the analyzing position at column 25, the operator can then effect the punching of a variable data on the detail card in the usual manner and finally bring the carriage to the "last column" position. At this moment, the contact CDC (Fig. 2d) closes, allowing the energization of relay 62 which opens its contact 62a, cancelling the voltage of conductor 142 thereby interrupting the holding circuit of relay 43 which had been energized during the storage operations.

The machine continues its usual automatic operation that is to say the first detail card is ejected, and a second detail card is brought to the carriage which then goes into the first column position.

The case to be examined next is when the machine is in "automatic" operating condition, that is to say with switch 72 (Fig. 2d) closed.

It is assumed to begin with, that the operator has noted no change in the semi-constants (second and first stage) on the control papers. The machine will thus proceed automatically every time the director card is in the analyzing position on one of the columns 1 to 24, the operator need then intervene only for the manual punching of the variable data in the columns other than 1 to 24 of the detail cards.

The automatic reproduction of columns 1 to 6 therefore takes place in the same way as for the first detail card and the skipping of columns 7, 8, 9 occurs immediately afterwards in the manner previously indicated.

In column 10 of the director card, it is recalled that the analysis of perforations "12" and "2" results in the application of voltage to conductor 114 (Figs. 2b, 2c) and by the energization of relay 46. The circuit starting from conductor 114 continues by: 46a reversed, 45a in the rest position, 117, 43c in the rest position, 121, switch 72 closed and 131, thereby energizing relays A to F (Fig. 2c) in parallel. The storage device is now in the reading out condition, owing to the reversal of contacts Aa to Fa.

The voltage of conductor 124 is immediately transmitted by means of contacts MA1a, MD1a, MF1a to the common segments of combinations A, D, F since this combination is stored there.

Three decoding circuits are then put into operation and cause the energization of relays 23, 26, 28 and 29 (Fig. 2a), which displace their contacts 23e, 26c, 28a, to mention only those intervening at this moment.

Starting from conductor 121 (Fig. 2d) which is put under voltage, as indicated above, a shunt circuit is established through conductor 132 (Figs. 2d, 2b, 2a), 28a reversed, 133, 26c reversed, 134, 23e reversed, 135 (Figs. 2a, 2c), 126 (Figs. 2c, a, b), 116, 67a and electro-magnet "Sp." A column skip is thus automatically controlled by column 1 of the storage device. It is seen that the concurrent reversing of supplementary contacts 23e, 26c, and 28a prevents the reading-out of combination A, D, F from effecting the excitation of any of the electromagnets 0 to XI.

The arrival of the director card at column 11 is accompanied by the stopping of the selector brushes in column 2 of the storage device. In this column the relays MB2 and MD2 are energized and held, hence the establishment of two decoding circuits which can be traced if starting from conductor 124 (column 2 of storage device, Fig. 2c) as follows: (1) MB2a, brush, common segment, Ba reversed, 136 (Figs. 2c, 2a) relay 24; (2) MD2a, brush, common segment, Da reversed, 137 (Figs. 2c, 2a), relay 26. Contacts 24a, 24b, 26a, 26b are thus reversed. The shunt circuit, mentioned above now continues in a different way. Starting from: 132 which is under voltage (Figs. 2d, 2b, 2a), it continues by way of 28a in the rest position, 138 and 138a; a first circuit: 27a in the rest position, 26a closed and the electro-magnet VII, as second parallel circuit: 138a, 139, 25a in the rest position, 24b reversed, 23c in the rest position and the electro-magnet II. The punching of perforations "7" and "2" takes place on the detail card, column eleven, and the column skipping is automatically controlled by the punching block itself.

The automatic reproduction of the second and first stage constant characters continues in a similar way under control of the storage device, as well as for the detail cards following, as long as the operator has noted no changes in the second and first stage constants.

As soon as the operator notices such a change he must press either key 1 or 2 before the arrival of a new detail card to the punching position.

Let us assume that it is necessary to change the first stage constant. The operator then pressure key "1" thereby energizing relay 44 (Fig. 2d). As long as the "Second stage constant" field of the director card is being analyzed, nothing is changed in the automatic reproduction under control of the storage device.

Although 44b is reversed conductor 121 controlling the read-out is not put out of voltage as it is connected to 114 by 46a reversed, 45a in the rest position and 43c in the rest position.

On the other hand, when the director card arrives in the analyzing position of column 16, a perforation "12" and a perforation "1" are analyzed. Relay 45 is energized by an analyzing circuit including 101 (Figs. 2a, b, d) while the energization of relay 46 ceases. The voltage of conductor 114 (Figs. 2b, 2d) is transmitted to conductor 122 by means of 45a reversed, 46a in the rest position, 118, 44b reversed (as 44 remains energized from the moment of the actuation of key 1), 120, 122. Conductor 121 is thus no longer under voltage, this suppressing the energizing of relays A to F (Fig. 2c) thereby suppressing the read-out condition of the storage device, 122 now being under voltage, the successive energization of 50 and 51 (Fig. 2d) first causes the resetting to zero of the relays of column 7 of the storage device, by interruption of the corresponding holding line 124 (Fig. 2c) and then causes a voltage to be applied to codification line 125 (Figs. 2d, 2c), the storage device is then in a storing condition, at least for the remainder of the columns. If the new first stage constant is a number of 9 figures, for instance, the operator presses the appropriate key of the numerical keyboard, in order to store the first figure and punch it on the detail card at the same time, in the same way as for the initial storing already described and proceeds to a column by column recording of the figures of the first stage constant which follow. After the eventual punching of a variable data in the detail field, the automatic reproduction of the third, second and first stage constants can be resumed as previously described under the successive and repeated control of the director card and of the storage device.

For the control of supplementary operations of the machine, provision is made for two other combinations of perforations placed in the program field of the director card, besides the combination "12" and "7" controlling the spacing. Perforations "12" and "8" control the "tabulation" or field skipping.

Conductors 113a and b and 108 (Fig. 2b) are placed under voltage by perforations "12" and "8" respectively which inter alia causes 48 to be energized; 48 closes its contact 48a and causes the electro-magnet "Tab" usually existing on the machine to be energized.

Perforations "12" and "9" control the immediate ejection of the detail card. Conductors 113a and b, and 109 (Figs. 2a, 2b) are put under voltage by perforations "12" and "9" respectively, which causes 49 to be energized; 49 closes its contact 49a which causes the electro-magnet "Ejection" usually existing on the machine to be energized.

The semi-automatic operation of the machine can now be examined.

With this operation in view, the director card is provided with a perforation "6" in each first column of the second and first stage constant fields, and switch 72 (Fig. 2d) is left open. This kind of perforation is represented by dotted lines in Fig. 1.

It is sufficient to mention what happens after the second and first stage constants have been stored in the storage device, and after the third stage constant field has been automatically reproduced on a detail card which is at least the second one of the stack. The director card then comes to the analyzing position of column 10 where perforations "12," "2" and "6" are analyzed simultaneously. Let us recall that the analysis of perforations "12" and "2" results in the application of voltage to conductor 121 (Fig. 2d) at least when neither relay 43 nor 44 is energized. At the same time as perforation "6" is being analyzed, relay 52 is energized (connection 106 in parallel on 36, Figs. 2a, 2b, 2d). Opening its contact 52a, it prevents the application of voltage to conductors 131, 132 (Fig. 2d): this prevents the energization of relays A to F (Fig. 2c) and therefore the reading out from the storage device as well as the establishment of a feeding circuit of the spacing electro-magnet. As there is also no punching effected the carriage stops in the position indicated above. The operator, who is assumed to be moderately well trained, has then all the necessary time for consulting his control-papers in order to check on whether the second stage constant changes or not.

When this constant is not modified, the operator presses the "0" or duplication key. Relay 92 (Fig. 2d) is then energized by the circuit + terminal (Fig. 2b), 100, 140 (Figs. 2b, 2d), key "0" and remains energized by means of its contact 92a. At the same time as relay 92 is energized, 53 also becomes energized and closes its contact 53a, parallel with 52a. The closing of 53a cancels the effect of perforation "6" since the energization of relays A to F is again possible.

The reading out of the first column of the storage device takes place, the present example refers to the combination A, D, F which results in the control of one spacing. During the displacement of the carriage from the 10th to the 11th column, the escape contact CE (Fig. 2b) is opened thereby interrupting the holding circuit of relay 92 and therefore cancelling the energization of relay 53. The opening of 53a allows contact 52a to resume its function as a switch for the automatic reproduction under control of the storage device. This reproduction continues for columns 11 to 15 of the director card until it arrives in the analyzing position of column 16 where a perforation "6" is again analyzed. The carriage is therefore stopped in this position.

In a case when the first stage constant is to be modified, the operator presses key "1" (Fig. 2d) thereby causing 44 to be energized by: + terminal (Fig. 2b) 100, 140 (Figs. 2b, 2d), key "1,"44. The closing of 44a establishes the holding circuit: + terminal (Fig. 2b), 141, (Figs. 2b, 2d), 62a, 142, 44a, 44.

As a result of the analysis of perforations "12" and "1," conductor 114 is alive and relay 45 is energized. Conductor 122 (Fig. 2d) is therefore put under voltage by: 114, 45a reversed, 46a in the rest position, 118, 44a reversed, 120, thus allowing for the successive energization of 50 and 51, which places the storage device in a storing condition. The operator can then store and record the new first stage constant.

In examining the storage device codification table, it may be observed that it is not adapted for controlling the punching of a "12" perforation. It is sometimes necessary however to effect this perforation in one or several columns of the "program" field. In this case, the director card is provided with an "11" perforation in all columns of the program field which are to control the punching of a "12" perforation. This perforation "11" may be added in the columns receiving one of the combinations "12" and "2," "12" and "1," "12" and "7."

When the director card is in the analyzing position on a column containing at least the combination "12" and "11" the analysis of perforation "12" puts conductor 112 under voltage (Fig. 2b) and the analysis of perforation "11" energizes 63 which closes its contact 63a and allows for the energization of electro-magnet XII by means of the circuit: + terminal (Fig. 2b), 100, CE, 103, 66a, 104 (Figs. 2b, 2a), 61, 59, brush 82, right side of reverser 71 (Fig. 2b), 112, 63a closed, 143 and electro-magnet XII.

Thus the punching of a "12" perforation is effected in the detail card and does not interfere with the concomitant operations either of storing in the storage device or read-out from the storage device.

If a new director card (or second D card) is to be prepared owing to the change in the third stage constant while the program field perforations are identical with those of the preceding director card (or first D card), the operator proceeds as follows:

After having placed the first D card in the "master card" section of the carriage and the second D card in the "detail card" section and after having brought the carriage into the analying positizon of the first column, the operator presses key "3" (Fig. 2b) which is of use for this operation only.

The energization of relay 64 results from the closure of key-contact "3." Relay 64 is then held by 64a found on the circuit 142, 62a, 141 and causes the closing of 64b and the reversing of 64c and 64d. As the third stage constant field, by definition, has no perforation "12," relay 42 cannot be energized at this moment. It follows that conductor 105 (Figs. 2b, 2a) cannot receive the voltage of 110 (Fig. 2b) owing to the interruption of the circuit by 64c reversed and 42a in the rest position. As long as the operator does not actuate any key of the keyboards, the effect of the condition mentioned above is to prevent the perforations under the analyzing brushes from effecting their reproduction on the second D card, by means of the actuation of the electro-magnets of the corresponding figures. However the cancelling of the voltage of conductor 105, is not sufficient for preventing untimely parallel circuits by possible perforations on the first D card if the operator wishes to strike a letter of the new third stage constant.

It is necessary to interrupt the return circuit of the analyzing roller. This is the function of contact 64b which, when closed, allows for the feeding of 66 which opens its contact 66a (Fig. 2b) and thus prevents any energization of the analyzing relays 30 to 39 and 41 during the time the third stage constant field passes under the analyzing device. As the perforations of this field in the first D card can therefore not be analyzed and reproduced, the operator need only punch the new third stage constant, column by column, on the second D card.

After this, the carriage naturally arrives in the analyzing position of column 7 citing again the example of the card figure 1. This time, as there is a perforation "12," relay 42 (Fig. 2b) is energized and reverses its contact 42a. Owing to the simultaneous reversing of 42a and of 64c, conductor 105 is again put under voltage.

The electro-magnet VII is then fed by the circuit: + terminal (Fig. 2b), 100, CE, 110, 42a and 64c reversed, 105 (Figs. 2b, 2a), 37a reversed (owing to a perforation under brush "7") and electro-magnet XII. Electro-magnet XII is also fed by the circuit: + terminal (Fig. 2b), 100, CE, 103, 66a, 104, 61, 59, brush 82, left side of reverser 71, 113a, 64d reversed, 144, 143 (Figs. 2b, 2a), electro magnet XII. Perforations "7" and "12" of column 7 are thus automatically reproduced and the same occurs for all perforations in the other columns of the program field.

The machine can also work as an ordinary punching-reproducing machine. It is only necessary to place reverser 71 (Fig. 2b) in the position represented by the dotted lines, in order to eliminate the storage device and all devices being the subject of the invention. When the reverser is in this position, it is seen that the perforation "12" brush can directly feed electro-magnet XII, this being necessary as the ordinary master card may bear one, or several perforations "12" which are generally intended for controlling a spacing of the carriage. This is why reverser 71, by means of a parallel circuit, in this position, allows the energization of relay 67 and consequently the energization of the "Spacing" electro-magnet, by reversing 67a.

Although the characteristic features of the invention have been applied here to a special realization, it is evident that even were this example modified by substitutions and omissions, it would still not depart from the scope of the present invention.

I claim:

1. In a card punching machine having a card sensing device, and a card carriage for feeding one control master card and a detail card step by step respectively past said sensing device and past one columnar row of punches, said control master card having columns of index-point positions with perforations representative of constant data, the columns of a so-called "program" field bearing a special perforation in a position non-used for the data recording, some of the columns of the program field bearing a further perforation, a duplicating arrangement to automatically reproduce constant data from said control master card on a plurality of detail cards, a relay storage device containing another data, a first control means prepared to be operative upon sensing of said special perforation, a second control means rendered operative when the first column with said further perforation is sensed, both control means enabling, when operative, the automatic punching of said other data from the storage device on the same plurality of detail cards, control means operated manually when said other data is to be changed for inhibiting the duplicating arrangement and setting the storage device from read-out condition into receiving condition.

2. In an automatically operated card punching machine having means for feeding one control master card and a detail card column by column respectively past a sensing device and a row of punches, punch selecting and actuating means therefor and a set of keys for actuating each a related selecting means, in combination, said control master card having columns of perforations distributed in positions representative of constant data to be automatically reproduced, and other columns each designated by a special perforation in a position indicative of "program" field, some of the last named columns being further designated by another perforation, a storage device comprising several groups of relays to store decimal digits in form of binary combinations, a coding circuit arrangement for controlling entries in the storage device, control means responsive to the sensing of said special perforation, control means responsive to the sensing of said other perforation, manually operated control means, the actuation of one key for punching a digit controlling at the same time the resetting of a group of storage relays and also the entry of a corresponding binary combination into said group when the aforesaid control means are effective concurrently.

3. The invention set forth in claim 2, in which the storage device comprises a column selector with a set of conducting members movable step by step for enabling successive entries of binary combinations into said groups of storage relays, an actuating magnet for effecting a stepping of said set of members, relay means to control said actuating magnet, said means being rendered operative as the control means responsive to the sensing of perforations are effective concurrently.

4. The invention set forth in claim 3, in which the storage device comprises, for each group of storage relays, a resetting relay for interrupting, when actuated, the registering condition of its associated group, one of said resetting relays being momentarily actuated according to the position of said set of members when the aforesaid control means are effective concurrently.

5. In an automatically operated punching machine having one columnar row of punches, selecting and actuating means therefor, a card sensing device and a carriage to feed a detail card and one control master card step by step respectively past said row of punches and sensing device, said control master card bearing perforations representative of data to be duplicated on a plurality of detail cards, a special perforation in a position non-used for representation of data in each column of a so-called "program" field, some of the columns of said field being designated by another perforation, and the first column to be sensed among the columns thus designated bearing a further perforation, a relay storage device having columns of coded storage relays with another data registered therein, a decoding circuit arrangement intermediate between said storage device and the punch selecting means, several control means separately responsive to the sensing of said special perforation and of said other perforation, for normally controlling the punching column by column of said other data registered, further control means responsive to the sensing of said further perforation for preventing the storage device from controlling said punching.

6. A punching machine according to claim 5, wherein a manually operable control device is provided, said control device being operated at will when said further control means is effective to suppress the action of the latter and permit the storage device to control the punching of said other data registered in it.

7. In a card punching machine means for feeding one control master card and a detail card step by step respectively past a sensing device and punching mechanism, and machine function control means actuated by key to initiate a stepping operation for the feeding means, said control master card bearing perforations in positions representative of constant data to be duplicated and a so-called "program" field of columns each designated by a special perforation in a position non-used for representing data, some of said columns being further designated by another perforation, a storage device comprising groups of storage relays, control means responsive to the sensing of said special perforation, control means responsive to the sensing of said other perforation, manually operable control means permitting when operative, both previous control means to set the storage device into receiving condition, a coding circuit arrangement intermediate between the storage device and said machine function control means for enabling the latter, when actuated, to cause the entry of a predetermined coded combination representative of the said stepping operation, into a group of relays of the storage device, when the latter is set in receiving condition.

8. The invention set forth in claim 7, in which the storage device comprises a column selector movable column by column to read out the entries registered in said groups of relays when said manually operated control means is not operated, there being provided a decoding circuit arrangement intermediate between the read-out circuits of the storage device and said machine function control means, said control means responsive to the sensing of the perforations setting, when effective concurrently, the storage device into read-out condition, so as to cause the automatic initiation of a stepping operation when the corresponding coded combination is being read-out from a group of storage relays, through said decoding circuit arrangement and machine function control means.

9. The invention set forth in claim 8, in which the decoding circuit arrangement includes contact means automatically set when said predetermined coded combination is being read-out for preventing said combination to be transmitted to the punching mechanism.

10. In a card punching machine having a punching mechanism, a card sensing device and a card carriage for advancing a detail card and one master card in a column by column stepping movement respectively past said punching mechanism and said sensing device, a settable storage apparatus having columns of relays with a coded data registered therein, a decoding circuit arrangement, a first control means responsive to the sensing, in a fixed zone of the master card, of a special perforation having a predetermined position independent of any data to be recorded on the detail cards, a second control means responsive to the sensing, in a fixed part of said zone, of another pre-determined perforation which has one of several values, determined independently of any data to be recorded on the detail card, said first and second control means controlling, when effective concurrently, the punching column by column on said detail card, of the data registered in the storage apparatus, through the decoding circuit arrangement and punching mechanism.

11. In a card punching machine having a row of punches, selecting and actuating means therefor, a card analyzing device and a card carriage for advancing a detail card and one control master card, in a column by column stepping movement respectively past said row of punches and said analyzing device, said control master card bearing perforations in positions representative of a constant data to be duplicated and a so-called "program" field of columns each designated by a special perforation not used for representation of said constant data, some of said columns being further designated by a second perforation, means for selecting and controlling the punches so as to automatically duplicate said constant data perforations on the detail card, when they are analyzed, a storage apparatus having columns of relays with another coded data stored therein, a first control means responsive to the analysis of said special perforation to render the punch selecting means ineffective and thus stop the duplication, a second control means responsive to the analysis of said second perforation, said first and second control means causing when operative the storage apparatus to control said punch selecting means.

12. The invention set forth in claim 10, in which the storage apparatus includes a column selector with a set of brushes movable step by step successively to read-out the data stored in the groups of storage relays, an actuating magnet for moving step by step said set of brushes, relay means to control said actuating magnet, said relay means being rendered operative when said first and second control means responsive to the sensing of perforations are operative concurrently.

References Cited in the file of this patent
UNITED STATES PATENTS

| | | |
|---|---|---|
| 1,863,097 | Borel | June 14, 1932 |
| 1,950,504 | Martin | Mar. 13, 1934 |
| 2,032,805 | Lake | Mar. 3, 1936 |
| 2,045,977 | Bryce | June 30, 1936 |
| 2,046,082 | Mills | June 30, 1936 |
| 2,451,752 | Lake | Oct. 19, 1948 |